(12) United States Patent
Hopkins et al.

(10) Patent No.: US 7,247,006 B2
(45) Date of Patent: Jul. 24, 2007

(54) METHOD AND APPARATUS FOR SEALING AN ULTRAHIGH-PRESSURE FLUID SYSTEM

(75) Inventors: Jordan J. Hopkins, Seattle, WA (US); Adrian Hawes, Seattle, WA (US); William L. Old, Burien, WA (US)

(73) Assignee: Flow International Corporation, Kent, WA (US)

( * ) Notice: Subject to any disclaimer, the term of this patent is extended or adjusted under 35 U.S.C. 154(b) by 291 days.

(21) Appl. No.: 10/423,661

(22) Filed: Apr. 25, 2003

(65) Prior Publication Data

US 2003/0197377 A1 Oct. 23, 2003

Related U.S. Application Data

(63) Continuation-in-part of application No. 10/038,507, filed on Jan. 2, 2002, now Pat. No. 6,802,541.

(51) Int. Cl.
*F04B 17/00* (2006.01)
*F04B 19/24* (2006.01)
*F04B 39/10* (2006.01)

(52) U.S. Cl. ............... 417/415; 417/53; 417/571
(58) Field of Classification Search ............ 417/415, 417/53, 572, 437, 571; 277/909, 908, 907, 277/436, 437, 438, 439
See application file for complete search history.

(56) References Cited

U.S. PATENT DOCUMENTS

| | | | |
|---|---|---|---|
| 2,321,927 A | 6/1943 | McCoy et al. | 286/27 |
| 3,429,581 A | 2/1969 | Himmel | 277/180 |
| 3,877,113 A | 4/1975 | Reyes | 24/115 M |
| 4,181,332 A | 1/1980 | Neumann | 285/334.4 |
| 4,239,244 A * | 12/1980 | Brent | 277/584 |
| 4,540,205 A | 9/1985 | Watanabe et al. | 285/329 |

(Continued)

FOREIGN PATENT DOCUMENTS

EP 1 397 493 6/1975

(Continued)

*Primary Examiner*—Anthony D. Stashick
*Assistant Examiner*—Ryan Gillan
(74) *Attorney, Agent, or Firm*—Seed Intellectual Property Law Group PLLC

(57) ABSTRACT

An ultrahigh-pressure fluid system, such as an ultrahigh-pressure fluid pump, includes an improved dynamic seal assembly that can withstand pressures above 40,000 psi, and more preferably, pressures up to and beyond 87,000 psi. The dynamic sealing assembly includes a plastic seal having a bore through which the plunger reciprocates, and a bearing positioned adjacent the seal, also having a bore through which the plunger reciprocates. A seal carrier surrounds the circumference of the bearing and is subjected to a compressive force that is sufficiently high to circumferentially collapse the seal carrier in a radial direction against the bearing. This collapse of the seal carrier against the bearing causes an inner surface of the bore through the bearing to achieve substantially uniform contact with an outer surface of the plunger when the assembly is subjected to ultrahigh-pressure, thereby eliminating gaps that occur in prior art systems. By eliminating any gap between the seal carrier and the bearing, and between the bearing and the plunger, the present invention eliminates any pathway through which the seal might otherwise extrude, particularly when subjected to high pressures up to and beyond 40,000 psi, and more particularly, up to and beyond 87,000 psi.

21 Claims, 4 Drawing Sheets

U.S. PATENT DOCUMENTS

| | | | |
|---|---|---|---|
| 4,817,962 A | 4/1989 | Mott et al. ..................... 277/1 |
| 5,002,316 A | 3/1991 | Chohan ..................... 285/110 |
| 5,007,276 A * | 4/1991 | Kadis et al. .................. 72/351 |
| 5,120,084 A | 6/1992 | Hashimoto .................. 285/156 |
| 5,143,410 A | 9/1992 | Takikawa ................... 285/197 |
| 5,172,939 A | 12/1992 | Hashimoto .................. 285/24 |
| 5,350,200 A | 9/1994 | Peterson et al. ............. 285/92 |
| 5,489,127 A | 2/1996 | Anglin et al. ............... 285/328 |
| 5,493,954 A * | 2/1996 | Kostohris et al. ............. 92/168 |
| 5,588,680 A | 12/1996 | Cassel et al. ................. 285/3 |
| 5,667,255 A | 9/1997 | Kato ....................... 285/133.4 |
| 5,725,259 A | 3/1998 | Dials ....................... 285/334.4 |
| 6,045,162 A | 4/2000 | Haibara ........................ 285/55 |
| 6,045,165 A | 4/2000 | Sugino et al. .............. 285/333 |
| 6,086,070 A * | 7/2000 | Tremoulet et al. .......... 277/586 |
| 6,162,031 A * | 12/2000 | Tremoulet, Jr. ............. 417/569 |
| 6,241,492 B1 * | 6/2001 | Pacht ......................... 417/567 |
| 6,279,965 B1 | 8/2001 | Kida .......................... 285/268 |
| 6,305,693 B1 * | 10/2001 | Wehrle ....................... 277/377 |
| 6,312,022 B1 | 11/2001 | Brophy, III et al. ........ 285/268 |

FOREIGN PATENT DOCUMENTS

GB            1 344 894           1/1974

\* cited by examiner

METHOD AND APPARATUS FOR SEALING AN ULTRAHIGH-PRESSURE FLUID SYSTEM

CROSS-REFERENCE TO RELATED APPLICATION

This application is a continuation-in-part of U.S. patent application Ser. No. 10/038,507, entitled "Components, Systems, and Methods for Forming a Gasketless Seal Between Like Metal Components in an Ultrahigh-Pressure System," filed Jan. 2, 2002, now U.S. Pat. No. 6,802,541 which application is still pending and is incorporated herein in its entirety by reference.

BACKGROUND OF THE INVENTION

1. Field of the Invention

The present invention relates to ultrahigh-pressure fluid systems, and in particular, to methods and assemblies for sealing ultrahigh-pressure systems, such as ultrahigh-pressure pumps.

2. Description of the Related Art

High-pressure pumps draw a volume of fluid into the pump on an intake stroke of a plunger, and on a pressure stroke of the plunger, pressurize the volume of fluid to a desired pressure, up to and beyond 87,000 psi. The pressurized fluid flows through a check valve body to an outlet check valve. If the pressure of the fluid is greater than a biasing force provided by high-pressure fluid in an outlet area acting on a downstream end of the outlet check valve, the high-pressure fluid overcomes the biasing force, and passes through the outlet check valve to the outlet area. Typically, a pump has multiple cylinders, and pressurized fluid from the outlet area of each pump is collected in an accumulator. High-pressure fluid collected in this manner is then selectively used to perform a desired function, such as cutting or cleaning. Such pumps are manufactured, for example, by the assignee of the present invention, Flow International Corporation of Kent, Wash.

Applicants believe it would be desirable in many situations to operate such pumps at higher pressures than can be achieved reliably at the present time. For example, when various pump components, such as dynamic seals, are subjected to high pressures, up to and beyond 87,000 psi, the seals have a relatively short fatigue life, failing at undesirably short intervals, causing down time of the machine and lost productivity.

More particularly, as the plunger reciprocates within a bore of the pump cylinder, the plunger passes through a dynamic seal that prevents pressurized fluid in the cylinder from flowing past the plunger into the pump. One such dynamic seal is shown in U.S. Pat. No. 6,086,070 which is incorporated herein by reference in its entirety, and which is assigned to the assignee of the present application, Flow International Corporation. The dynamic seal in U.S. Pat. No. 6,086,070 includes a seal carrier 12 that functions as a backup ring for the seal 18. The seal carrier further includes an annular guidance bearing positioned in an annular groove of the seal carrier, the guidance bearing being axially spaced from the seal. An inner diameter of the seal carrier in the region between the seal and the guidance bearing is larger than an inner diameter of the guidance bearing such that a small gap exists between the seal carrier and the plunger. While such an arrangement operates well at very high pressures, up to and beyond 40,000 psi, the seal tends to extrude through the gap between the seal carrier and plunger when such a dynamic seal is exposed to pressures up to and beyond 87,000 psi.

In yet another currently existing dynamic seal, shown in FIG. 1, a plunger reciprocates through a dynamic seal having a plastic seal, o-ring, and metal hoop seal that are supported by a backup ring made from a bearing material such as aluminum-bronze. The cylinder is tightened along its planar interface with the backup ring by tightening tie rods, as is known in the art. At very high pressures, for example up to and beyond 87,000 psi, the gap between the backup ring and the plunger is not closed uniformly under pressure and again, the seal extrudes through any available gap causing failure of the dynamic seal. Given the very short component life, frequent component replacement is required, resulting in down time of the machine, lost productivity, and possible damage to the pump. Not only are such failures due to extrusion of the seal, but failure may also result from splitting of the plastic seal, and premature o-ring and seal hoop failure caused by relative motion between the high-pressure components.

Therefore, a need exists for an improved dynamic seal that can withstand pressures above 40,000 psi, and more particularly, pressures up to and beyond 87,000 psi. The present invention meets this need.

BRIEF SUMMARY OF THE INVENTION

The present invention provides an improved dynamic seal for use in an ultrahigh-pressure fluid system, such as an ultrahigh-pressure fluid pump, for example those manufactured by Flow International Corporation. The improved dynamic seal provided in accordance with the present invention can withstand pressures above 40,000 psi, and more preferably, pressures up to and beyond 87,000 psi. The present invention therefore allows pumps to operate reliably at pressures that were previously unattainable, resulting in increased productivity and efficiency.

In a first embodiment, an ultrahigh-pressure fluid system provided in accordance with the present invention has a dynamic seal through which a plunger reciprocates, the dynamic seal preventing pressurized fluid from flowing past the plunger. The dynamic sealing assembly includes a plastic seal having a bore through which the plunger reciprocates, and a bearing positioned adjacent the seal, also having a bore through which the plunger reciprocates. A seal carrier surrounds the circumference of the bearing and is subjected to a compressive force that is sufficiently high to circumferentially collapse the seal carrier in a radial direction against the bearing. This collapse of the seal carrier against the bearing causes an inner surface of the bore through the bearing to achieve substantially uniform circumferential contact with an outer surface of the plunger when the assembly is subjected to loading during assembly, thereby eliminating gaps that occur in prior art systems. By eliminating any gap between the seal carrier and the bearing, and between the bearing and the plunger, the present invention eliminates any pathway through which the seal might otherwise extrude, particularly when subjected to high pressures up to and beyond 40,000 psi, and more particularly, up to and beyond 87,000 psi.

The compressive force on the seal carrier is achieved by tightening tie rods of the system that load a cylinder positioned adjacent the seal and the seal carrier, the cylinder being seated against the seal carrier in such a way as to form a static seal along a tangential sealing area. In a preferred embodiment, this compressive force is sufficiently great, and is applied in such a manner given the geometry of the system, that the seal carrier deforms uniformly to substantially eliminate any gap that might exist between the seal carrier and bearing, and in turn, precisely collapses the bearing onto the plunger to substantially eliminate any gap between the bearing and the plunger, particularly in a region adjacent the seal. Depending on the strength of the material used, this deformation may be elastic or plastic in nature.

DETAILED DESCRIPTION OF THE INVENTION

In many situations, it would be desirable to operate ultrahigh-pressure fluid pumps at higher pressures than can be achieved reliably at the present time. For example, an ultrahigh-pressure intensifier pump, such as those manufactured by Flow International Corporation, may be used for a variety of applications, such as supplying high-pressure fluid to an abrasive waterjet cutting head, or pressurizing a pressure vessel to pasteurize food products. While the below discussion will use an ultrahigh-pressure intensifier as an example, it will be understood that the present invention has application in sealing an axially reciprocating plunger of any high-pressure pump.

As described previously, a reciprocating plunger in an intensifier reciprocates within a bore of the pump cylinder. Fluid is maintained within a desired pressurizing region of the pump cylinder by a dynamic seal surrounding the plunger. While a variety of such dynamic seals have been used previously, one example is that shown in U.S. Pat. No. 6,086,070. It will be understood from a reading of that patent that a gap exists between the seal carrier and the plunger, in a region adjacent the seal. While such an arrangement performs well at very high pressures, up to and beyond 40,000 psi, the seal tends to extrude unacceptably through the gap between the seal carrier and plunger when such a dynamic seal is exposed to pressures up to and beyond 87,000 psi (6,000 bar).

Figure 1:
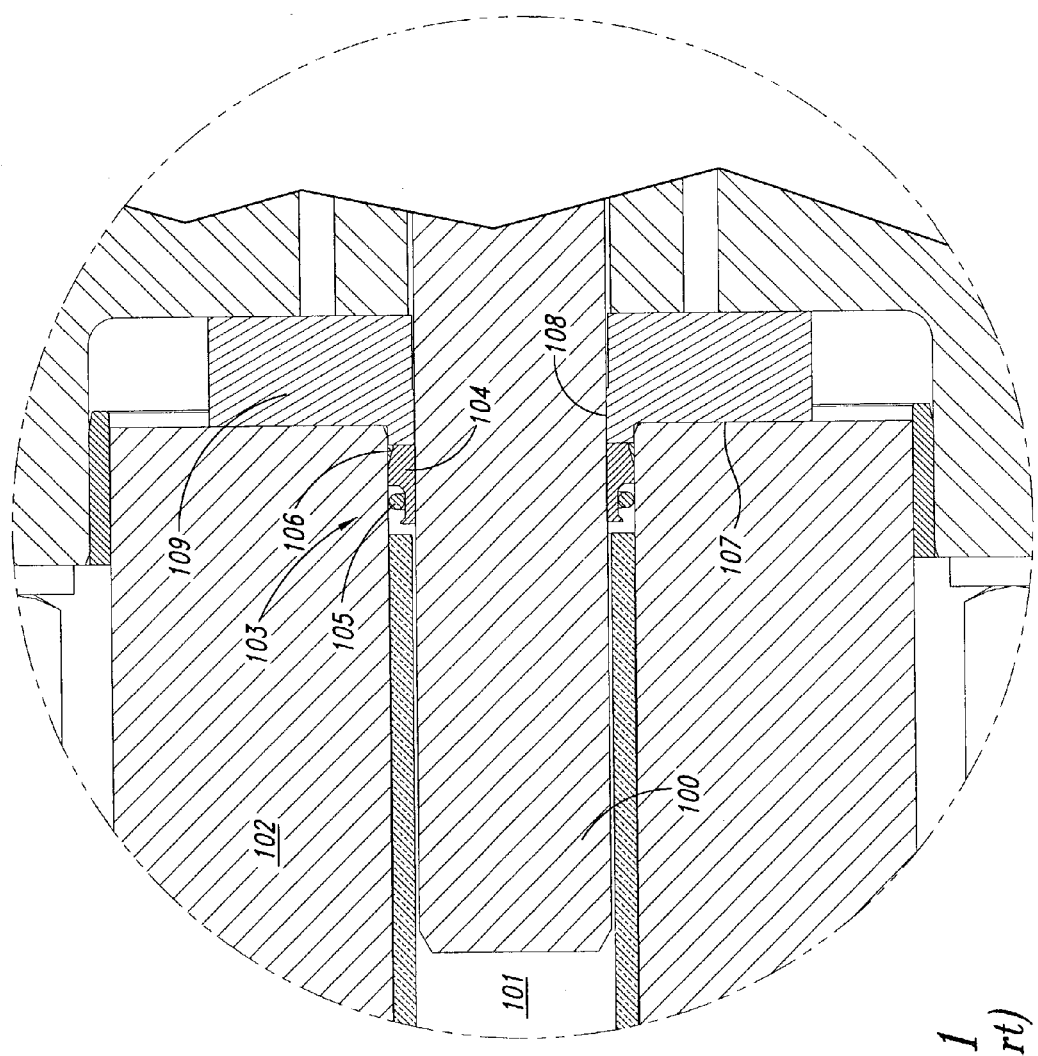
FIG. 1 is a cross-sectional view of a dynamic seal for an ultrahigh-pressure pump provided in accordance with a prior art system.

Another currently available dynamic seal employed to seal a reciprocating plunger, is shown in FIG. 1. As plunger 100 reciprocates within bore 101 of the cylinder 102, fluid within the bore 101 is prevented from flowing past the plunger into the pump by dynamic seal 103. The dynamic seal 103 includes a plastic seal 104, an o-ring 105, and a stainless steel seal hoop 106 that are supported by a backup ring 109 made from a bearing material such as aluminum-bronze. An end surface of the cylinder 102 sits flush against a planar end face of the backup ring 109, forming a planar interface 107. The cylinder 102 is tightened along its planar interface 107 with the backup ring 109, by tightening tie rods, as is known in the art. A small gap 108 exists between the backup ring and the plunger. At very high pressures, for example, above 55,000 psi, the dynamic seal 103 begins to fail at undesirably short intervals. Such failures are believed to be due to many things, including extrusion of the seal 104 through gap 108, splitting of the seal 104, and premature failure of the o-ring 105 and seal hoop 106 caused by relative motion between the high-pressure components. These problems are exacerbated at even higher pressures, for example, up to and beyond 87,000 psi. More particularly, a dynamic seal as shown in FIG. 1 may last less than 40 hours at 87,000 psi. This is an unacceptably short component life, requiring frequent component replacement, down time of the machine, lost productivity, and possible damage to the pump.

Figure 2:
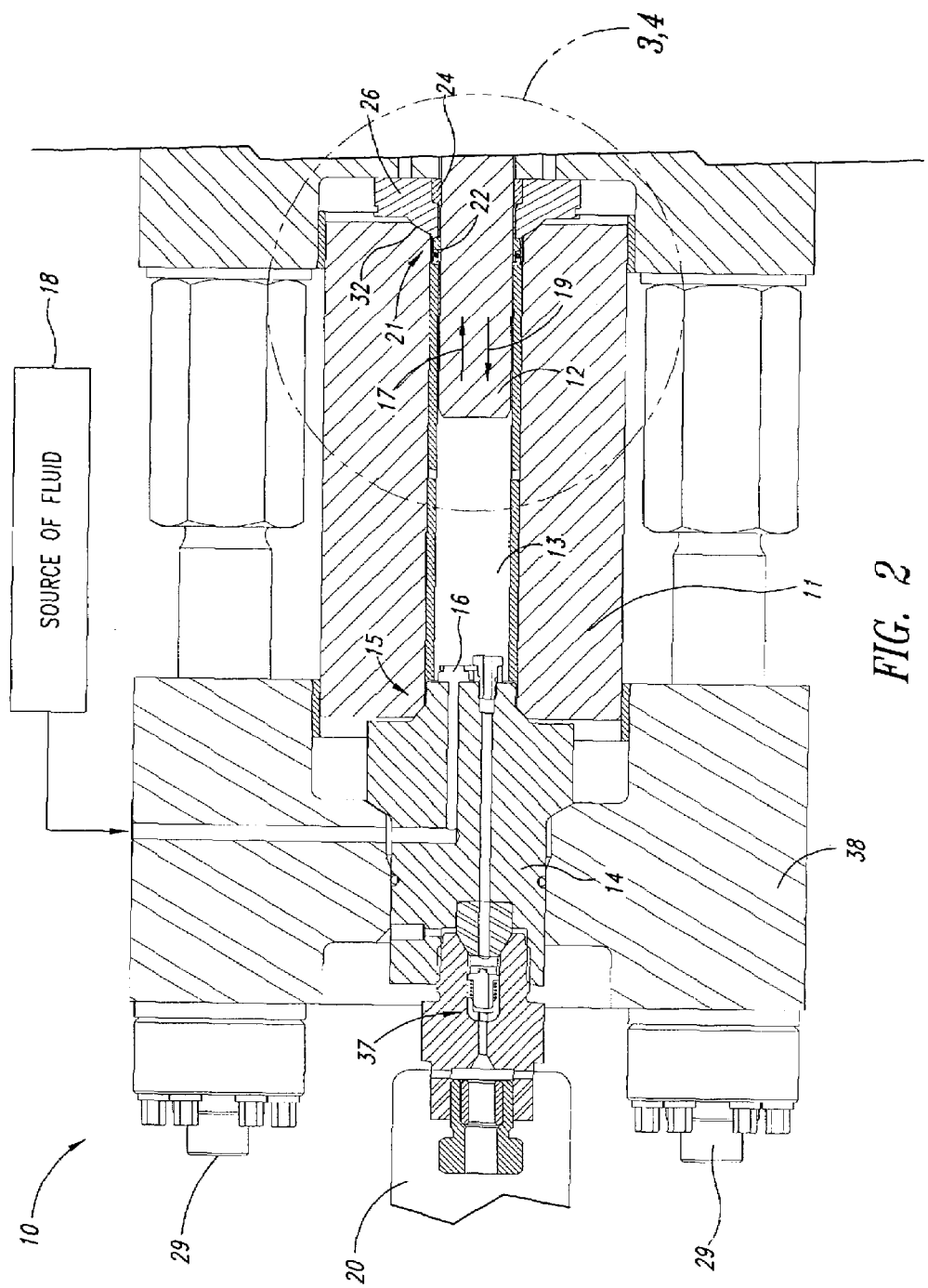
FIG. 2 is a partial cross-sectional plan view of an ultrahigh-pressure pump, incorporating a dynamic seal provided in accordance with the present invention.

An intensifier is able to run reliably at 87,000 psi in accordance with the present invention. As shown in FIG. 2, an ultrahigh-pressure fluid system 10, such as an intensifier pump, is provided with a plunger 12 that reciprocates within a bore 13 of pump cylinder 11. The plunger 12 draws a volume of fluid from a source of fluid 18 into the bore 13 via an inlet valve 16 provided in check valve body 14 on an intake stroke of the plunger illustrated by the direction arrow marked 17. On a pressure stroke 19, the plunger 12 pressurizes the volume of fluid, the pressurized fluid flowing through the check valve body 14 to the outlet check valve 37. If the pressure of the pressurized fluid is sufficiently high to overcome the biasing force on the outlet check valve 37, the pressurized fluid passes through the outlet check valve 37 to an outlet area 20, after which the pressurized fluid is collected in an accumulator and used in any desired manner, as is known in the art.

Figure 3:
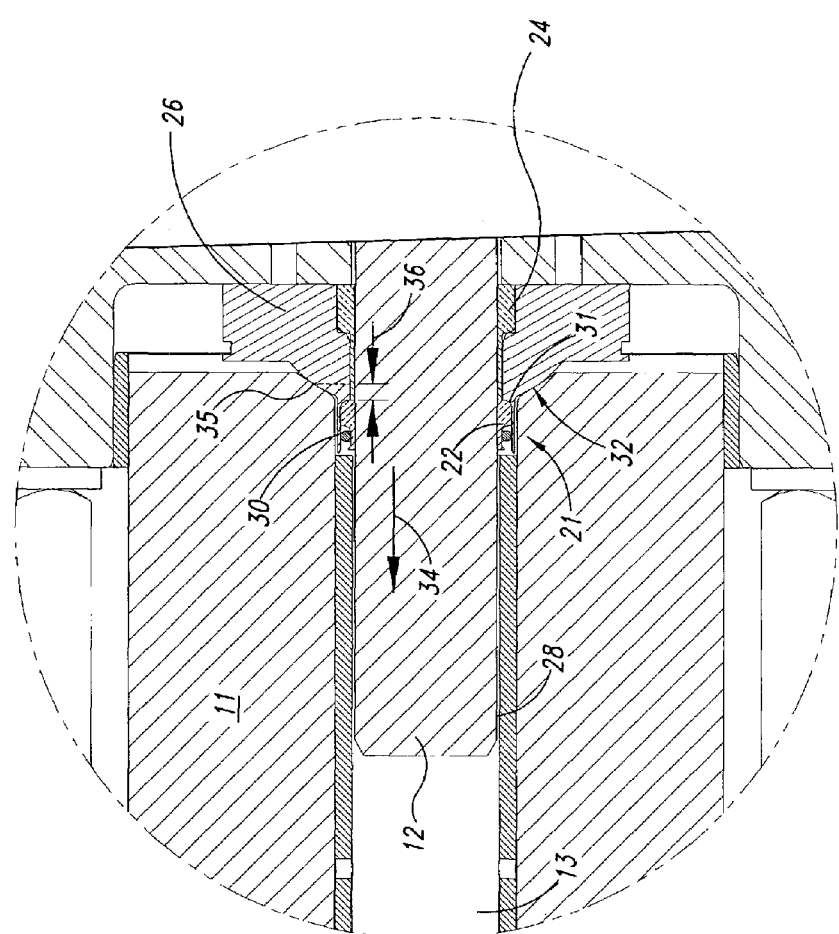
FIG. 3 is an enlarged cross-sectional plan view of the dynamic seal of FIG. 2, shown with a plunger.
Figure 4:
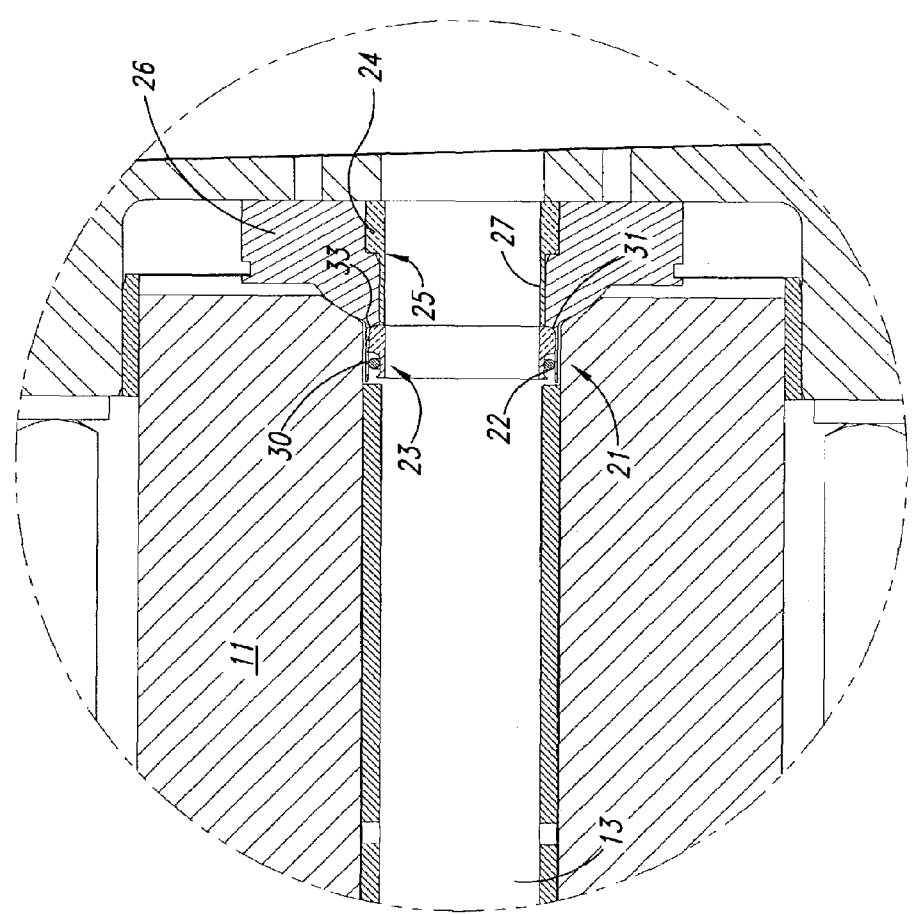
FIG. 4 is an enlarged cross-sectional plan view of the dynamic seal of FIG. 2, shown without a plunger.

As further shown in FIG. 2, and as may be best seen in FIGS. 3 and 4, the plunger 12 reciprocates through a sealing assembly 21 provided in accordance with the present invention. The sealing assembly 21 includes a plastic seal 22, for example made of ultrahigh molecular weight polyethylene. As best seen in FIG. 4, the annular seal 22 is provided with a bore 23 through which the plunger reciprocates. A bearing 24, is positioned adjacent the seal 22, and is also provided with a bore 25 through which the plunger 12 reciprocates. Therefore, the material of the bearing is chosen to be a material which can safely ride along the plunger while the plunger is in motion. While the bearing 24 and plunger 12 may be made of any appropriately cooperative materials, in one embodiment, the bearing 24 is made of a high strength bronze, or aluminum or copper alloy, and the plunger is made from a ceramic material, such as partially stabilized Zirconia (PSZ).

A seal carrier 26 surrounds a circumference of the bearing 24 and is positioned adjacent the seal 22. Although the seal carrier 26 may be made of a variety of materials, in a preferred embodiment, it is made of stainless steel. In accordance with the present invention, the seal carrier 26 is subjected to a compressive force that is sufficiently high to circumferentially collapse the seal carrier 26 uniformly in a radial direction against the bearing 24. This uniform collapse of the seal carrier 26 against the bearing 24 causes an inner surface of the bore 25 through the bearing 24 to achieve substantially uniform circumferential contact with an outer surface 28 of the plunger 12 when the assembly is subjected to ultrahigh pressure, thereby eliminating gaps that occur in prior art systems. In contrast, while a dynamic seal such as that illustrated in the prior art of FIG. 1 may be forced against the plunger under pressure, the closing of the gap between the backup ring and the plunger is not controlled, and does not occur uniformly around the circumference of the plunger. As a result, there may be contact between the backup ring and plunger on one side, and a gap on the other, allowing for the seal to extrude.

The compressive force on the seal carrier 26 is achieved by tightening tie rods 29 of the system that load the cylinder 11 via end cap 38 seating the check valve body 14 against a first end 15 of cylinder 11. The cylinder 11 is seated against the seal carrier 26 in such a way as to form a static seal along a tangential sealing area 32, as described in parent application Ser. No. 10/038,507. More particularly, in one embodiment, a radial compressive load is achieved through the compressed contact of a substantially flat tapered mouth of the cylinder against a convexly curved region of the seal carrier. In one embodiment, the included contact angle between the cylinder and backup ring is about 80-128 degrees, with a preferred range of about 100-118 degrees. Alternatively, the seal carrier may have a conical, substantially linear cross-sectional profile that forms an included angle of 80-128 degrees, and that mates against a convex, curved cross-sectional profile of the cylinder to form a substantially circular seal. A contact angle between the adjoining components of the cylinder and seal carrier is tangential to at least one of the components, the tangent measuring between 40 and 60 degrees from a longitudinal axis of the component.

The compressive force applied via the tie rods and the cylinder 11 on the seal carrier 26 is sufficiently great, and is applied in such a manner given the geometry of the system, including the bearing bore, and seal carrier/cylinder contact angle, that the seal carrier 26 deforms onto the bearing 24 in a controlled, uniform manner to substantially eliminate any gap that might exist between the seal carrier 26 and the bearing 24. In turn, the bearing 24 collapses onto the plunger 12 at a free end of the bearing to substantially eliminate any gap between the bearing 24 and the plunger 12, particularly in a region adjacent the seal 22.

By eliminating any gap between the seal carrier and the bearing, and between the bearing and the plunger, when the system is operating at pressure, the present invention eliminates any pathway through which the seal might otherwise extrude, particularly when subjected to high pressures up to and beyond 55,000 psi and more particularly, when subjected to pressures up to and beyond 87,000 psi. As a result, a system provided in accordance with the present invention may operate several hundred hours at 87,000 psi, as compared to less than 40 hours using conventional sealing assemblies.

Additionally, the compression of the cylinder 11 onto the seal carrier 26, through the loading of the tie rods 29, creates a metal-to-metal seal at the interface of these two components, namely along the tangential sealing area 32. As a result of the formation of this metal-to-metal static seal, the plastic seal 22 is not required to seal both outwardly, namely in the direction of the cylinder-seal carrier interface, as well as inwardly, namely in the direction of the plunger-seal carrier interface. As a result, relative motion to which the surfaces of the plastic seal are exposed is substantially reduced, thereby preventing the seal 22 from being pulled apart. Furthermore, the need for a seal hoop as used in prior art systems is eliminated, thereby simplifying the system and relieving problems associated with premature failure of the seal hoop component.

As can be best seen in FIGS. 3 and 4, a first end 33 of the seal 22 is supported across its width by both the bearing 24 and the seal carrier 26. This arrangement eliminates the problematic extrusion gap between the plunger and the seal carrier which occurs in some prior art designs where the seal is supported by only a stainless steel seal carrier, such that a gap must exist between the seal carrier and the plunger adjacent the seal. In addition, the arrangement provided in accordance with the present invention provides greater strength than currently available dynamic seals that support the seal across its width by only a bearing material, such as those illustrated in FIG. 1.

As may also be seen in FIGS. 3 and 4, the seal carrier 26 is provided with a cup 30 that extends along an outer surface 31 of the seal 22, thereby preventing the seal 22 from touching the cylinder 11. The positioning of the cup eliminates relative motion between the seal 22 and the cylinder 11 which would cause fretting of the seal and early failure. Furthermore, as shown in FIG. 3, the first end 33 of the seal 23 is positioned downstream of a center point 35 of the tangential sealing area 32, by a distance 36. ("Downstream" is indicated by reference arrow 34, and is in the direction of the pressurizing stroke of the plunger.) By providing a sealing assembly 21 in accordance with the present invention as shown in FIG. 3, the force of compression on the cup 30 of the seal carrier is greater than the force of expansion on the cup of the seal carrier while at pressure, thereby facilitating the further collapse of the seal carrier onto the bearing and the bearing onto the plunger in order to eliminate the gaps between the seal carrier, bearing and plunger.

The amount of deformation of the seal carrier 26 is a function of both the angles of the surfaces of the cylinder 11 and seal carrier 26 that form the tangential sealing area 32, and is also a function of the selected materials, as well as the amount of assembly loading, for example, as may be achieved through tightening of tie rods. While tie rods are described and illustrated in the present application, it will be understood that the loading at assembly may be accomplished in any available manner.

In one embodiment, the bearing is press fit into the seal carrier and a bore is machined therethrough. The softer the materials, the greater deformation will be achieved, and in turn, a larger bore will be needed, to accommodate a selected plunger. In a preferred embodiment, therefore, a material for the seal carrier having a desired strength is selected, and an inner diameter of the bore through the seal carrier is selected, to achieve a selected amount of contact between the bearing and the plunger for a given compressive force. More particularly, the seal carrier is made of a material whose strength is matched precisely to the final bore machined through the bearing, such that the amount of compression applied by the tie rods translates into a controlled amount of contact between the bearing and the high-pressure plunger.

As described previously, an ultrahigh-pressure fluid system provided in accordance with the present invention allows the system to operate reliably at pressures up to and beyond 87,000 psi, while maintaining a seal around a reciprocating plunger of the system. While the present invention enables reliable operation at pressures which cause failures in prior art systems, making the invention particularly beneficial at these higher pressures, it will be understood that the present invention also has application at lower pressures, up to and beyond 40,000 psi. The present invention therefore provides significant advantages over currently available systems. From the foregoing it will be appreciated that, although specific embodiments of the invention have been described herein for purposes of illustration, various modifications may be made without deviating from the spirit and scope of the invention. Accordingly, the invention is not limited except as by the appended claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A sealing assembly for an ultrahigh-pressure fluid system having a cylinder, the sealing assembly comprising:
   a seal having a bore through which a plunger may reciprocate;
   a bearing positioned adjacent the seal and having a bore through which the plunger may reciprocate;
   a seal carrier circumferentially surrounding the bearing and being subjected to a compressive force at least when in operation; and
   an inner surface of the bore of the bearing being in substantially uniform circumferential contact with an outer surface of the plunger when the assembly is subjected to loading during assembly, wherein
   the seal carrier is configured to contact the cylinder to form a static seal along a tangential sealing area, and the seal includes a first end contiguous a proximal end of the bearing with respect to the seal, the bearing includes a distal end with respect to the seal, opposite the proximal end of the bearing, and the first end of the seal is axially spaced from a center point of the tangential sealing area in a direction pointing from the distal end of the bearing toward the seal, when the sealing assembly is installed in the ultrahigh-pressure fluid system.

2. The assembly according to claim 1 wherein the compressive force on the seal carrier is sufficiently high to circumferentially collapse the seal carrier in a radial direction against the bearing.

3. The assembly according to claim 2, further comprising a plurality of tie rods that are tightened to apply the compressive force on the seal carrier.

4. The assembly according to claim 1 wherein the seal carrier and the bearing are adjacent to the seal, such that the seal is supported across its entire width by a combination of the seal carrier and the bearing.

5. The assembly according to claim 1 wherein the seal carrier includes a cup that extends along an outer surface of the seal, and the cup of the seal carrier and the seal are configured to ensure that a force of compression on the cup is greater than a force of expansion on the cup, when the assembly is subjected to ultrahigh-pressure.

6. The assembly according to claim 1, further comprising the cylinder positioned adjacent the seal and seal carrier, the cylinder being seated against the seal carrier to form a static seal along a tangential sealing area, and wherein the seal includes a first end contiguous a proximal end of the bearing with respect to the seal, the bearing includes a distal end with respect to the seal, opposite the proximal end of the bearing, and the first end of the seal is axially spaced from a center point of the tangential sealing area in a direction pointing from the distal end of the bearing toward the seal.

7. A sealing assembly for an ultrahigh-pressure fluid system, comprising:
   a seal having a bore through which a plunger may reciprocate;
   a bearing positioned adjacent the seal and having a bore through which the plunger may reciprocate; and
   a seal carrier circumferentially surrounding the bearing and being subjected to a compressive force at least when in operation, the compressive force being sufficiently high to circumferentially collapse the seal carrier in a radial direction against the bearing.

8. A sealing assembly for an ultrahigh-pressure fluid system, comprising:
   a seal having a bore through which a plunger may reciprocate, a first end of the seal being in contact with and supported across its entire width by a combination of a seal carrier made of a first material and a bearing made of a second material.

9. An ultrahigh-pressure pump, comprising:
   a plunger adapted to reciprocate through a bore of a seal and through a bore of a bearing, the plunger being operable to draw a volume of fluid into the pump on an intake stroke and to pressurize the volume of fluid on a pressure stroke; and
   a seal carrier surrounding the bearing and supporting the seal, the seal carrier being subjected to a compressive force, at least when in operation, that is sufficiently high to circumferentially collapse the seal carrier in a radial direction against the bearing and force the bearing against the plunger in a substantially uniform manner around the circumference of the plunger.

10. The pump according to claim 9, further comprising a cylinder positioned adjacent the seal carrier, the cylinder being seated against the seal carrier to form a static seal along a tangential sealing area, and wherein the pump, further comprises tie rods that are coupled to the cylinder and tightened to apply the compressive force on the seal carrier through the cylinder.

11. The pump according to claim 10 wherein the seal carrier includes a cup that extends along an outer surface of the seal, the cup of the seal carrier and the seal being configured relative to each other and to the cylinder to ensure that a force of compression on the cup is greater than a force of expansion on the cup, when the assembly is subjected to ultrahigh-pressure.

12. An ultrahigh-pressure pump, comprising:
   a plunger adapted to reciprocate through a bore of a cylinder;
   a check valve body coupled to a first end of the cylinder, the check valve body being provided with a plurality of valves that selectively allow fluid communication between the bore of the cylinder and a source of fluid and an outlet area, the plunger being operable to draw a volume of fluid into the bore of the cylinder on an intake stroke and to pressurize the volume of fluid on a pressure stroke;
   a seal positioned within the bore of the cylinder; and
   a seal carrier positioned adjacent the cylinder and the seal, a bearing surface being provided within a bore of the seal carrier through which the plunger may reciprocate, the bearing surface being forced against an outer surface of the plunger in a substantially uniform manner by a compressive force exerted against the seal carrier by the cylinder at least when in operation, the compressive force being sufficiently high to circumferentially collapse the seal carrier in a radial direction against the bearing.

13. The pump according to claim 12 wherein the compressive force on the seal carrier is sufficiently high to substantially uniformly deform the seal carrier, thereby substantially eliminating any gap that might exist between the bearing surface and the plunger.

14. A method for installing a sealing assembly in an ultrahigh-pressure fluid system, comprising;
   providing a seal carrier having a bore into which a bearing is press-fit;
   positioning a seal adjacent the seal carrier and bearing;
   providing a plunger through bores of the bearing and seal; and applying a compressive force on the seal carrier to collapse the bearing substantially uniformly around the circumference of the plunger.

15. The method according to claim 14, further comprising:
    positioning a cylinder adjacent the seal carrier, and applying the compressive force on the seal carrier through the cylinder.

16. The method according to claim 15, further comprising tightening a plurality of tie rods coupled to the cylinder to apply the compressive force on the seal carrier through the cylinder.

17. The method according to claim 14 wherein the compressive force is sufficiently great to substantially uniformly deform the seal carrier to substantially eliminate any gap that might exist between the seal carrier and bearing.

18. The method according to claim 14, further comprising:
    substantially eliminating any gap between the seal carrier and the bearing; and
    substantially eliminating any gap between the bearing and the plunger adjacent the seal.

19. The method according to claim 14, further comprising:
    selecting a material for the seal carrier having a known strength and selecting an inner diameter of the bore through the seal carrier to achieve a selected amount of contact between the bearing and the plunger for a given compressive force.

20. A sealing assembly for an ultrahigh-pressure fluid system, comprising:
    a seal having a bore through which a plunger may reciprocate;
    a bearing positioned adjacent the seal and having a bore through which the plunger may reciprocate;
    a seal carrier circumferentially surrounding the bearing and being subjected to a compressive force at least when in operation; and
    an inner surface of the bore of the bearing being in substantially uniform circumferential contact with an outer surface of the plunger when the assembly is subjected to loading during assembly; wherein
    the compressive force on the seal carrier is sufficiently high to circumferentially collapse the seal carrier in a radial direction against the bearing.

21. A sealing assembly for an ultrahigh-pressure fluid system, comprising:
    a seal having a bore through which a plunger may reciprocate;
    a bearing positioned adjacent the seal and having a bore through which the plunger may reciprocate;
    a seal carrier circumferentially surrounding the bearing and being subjected to a compressive force at least when in operation; and
    an inner surface of the bore of the bearing being in substantially uniform circumferential contact with an outer surface of the plunger when the assembly is subjected to loading during assembly; wherein
    the seal carrier and the bearing are adjacent to the seal, such that the seal is supported across its entire width by a combination of the seal carrier and the bearing.

* * * * *